United States Patent
Ronström et al.

(10) Patent No.: US 6,263,402 B1
(45) Date of Patent: Jul. 17, 2001

(54) DATA CACHING ON THE INTERNET

(75) Inventors: Ulf Mikael Ronström, Hägersten; Sven Patrik Johansson, Stockholm, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/367,817

(22) PCT Filed: Feb. 20, 1998

(86) PCT No.: PCT/SE98/00310

§ 371 Date: Jan. 31, 2000

§ 102(e) Date: Jan. 31, 2000

(87) PCT Pub. No.: WO98/37667

PCT Pub. Date: Aug. 27, 1998

(30) Foreign Application Priority Data

Feb. 21, 1997 (SE) .................................... 9700622

(51) Int. Cl.⁷ ..................................................... G06F 12/08
(52) U.S. Cl. ........................... 711/131; 711/122; 711/129; 709/218
(58) Field of Search .................................... 711/131, 129, 711/122; 709/218

(56) References Cited

U.S. PATENT DOCUMENTS

| 5,781,757 | * | 7/1998 | Deshpande | 711/146 |
| 5,781,924 | * | 7/1998 | Zaitzeva et al. | 711/131 |
| 6,104,701 | * | 8/2000 | Avargues et al. | 370/238 |

FOREIGN PATENT DOCUMENTS

| 0 628 708 | 10/1994 | (EP) . |
| 0 837 584 | 10/1997 | (EP) . |
| 96/38962 | 12/1996 | (WO) . |
| 98/37677 | 8/1998 | (WO) . |

OTHER PUBLICATIONS

"A Hierarchical Internet Object Cache", A. Chankhunthod, et al, 1996 USENIX Technical Conference, Jan. 22–26, 1996, San Diego, CA.

"A Distributed Internet Cache", D. Povey, et al, Proceedings of the 20th Australasian Computer Science Conference, Sydney, Australia, Feb. 5–7, 1997.

"Reduce, Reuse, Recycle: An Approach to Building Large Internet Caches", Syam Gadde, et al, 6th Workshop on Hot Topics in Operating Systems, May 1997 (USA), IEEE.

* cited by examiner

Primary Examiner—Hiep T. Nguyen
(74) Attorney, Agent, or Firm—Burns, Doane, Swecker & Mathis, L.L.P.

(57) ABSTRACT

A method of dealing with inquiries for data-information within a network is presented. A cache, which includes a number of nodes, acts within the network. Data-information may be stored in any of the cache nodes and may be available for a given period of time. The cache nodes are arranged in a hierarchical node tree structure. This tree structure includes a plurality of object nodes, a plurality of directory nodes, and a root node. The root node constitutes the root of the tree structure and the object nodes are positioned furthest out in the tree structure. All data-information is stored within object nodes. Any intermediate levels between an object node and the root node are comprised of directory nodes. The directory nodes and the root node include a directory that covers all data-information stored within object nodes that are located beneath the node in the tree structure and within which object node respective data-information is stored. When needing to transmit data-information requested by a user via a first object node, the object node that has the requested data-information is ordered to send this information to the first object node.

30 Claims, 4 Drawing Sheets

DATA CACHING ON THE INTERNET

FIELD OF INVENTION

The present invention relates to a method of dealing with requests for data information within a network that includes a plurality of users that request said data information, and a plurality of servers that supply data information.

Newly used data information is stored in a cache acting between a server and a user and including a number of different nodes.

The present invention also relates to a cache adapted to act in accordance with the method, and a node adapted to act within an inventive cache.

BACKGROUND OF THE INVENTION

It is known that a request for data information within a network, for instance when a user of the international network Internet seeks a specific home page on the network, may involve the user first connecting himself/herself with the network through a network operator and then addressing the server that contains the required information directly. The operator connects the user either persistently or temporarily to a computer unit or processor unit belonging to the operator and through which requests for information can be sent by the user on the network.

Since the server concerned may be positioned at a geographically remote location in the wise network, it is known that an operator, or some other actor on the network, provides a cache for collected information, in which newly used information is stored so as to be available to other users who may seek the same information. This is economically advantageous with respect to the operator and provides a much faster network for the user.

Such a cache may include a plurality of different nodes for connection to those users who avail themselves of the operator's services.

It is known to arrange the cache nodes in a hierarchical structure so as to be able to reduce the requirement of requisite bandwidths within the wise network; c.f. in this regard the publication "A Hierarchical Internet Object Cache", by Anawat Chankhunthod, Peter B. Danzig, Chuck Neerdaels, Michael F. Schwarz and Kurt J. Worrel, Computer Science Department, University of Southern California and Computer Science Department, University of Colorado—Boulder, 1995.

It is also known that the request for data-information within a network may involve:

a) the user requesting current or relevant data-information from a first node of a cache node set-up;

b) sending the requested data-information to the user, when said data-information is available within said first node;

c) the first node requesting said data-information from other cache nodes, when said data-information is unavailable in said first node;

d) sending the data-information to the user when case c) is fulfilled and when data-information is available in the cache;

e) fetching said data-information from the cache server and sending said data-information to the user when case c) is fulfilled and when data-information is unavailable in the cache;

wherein said data-information, after having been fetched from the server to the cache, is available in the cache for a given period of time so as to be available for any requests for this information from other users.

In a hierarchy of this kind, it is also known to implement e) above, by the higher level node fetching the requested information from the server concerned and then sending this information to the first node which, in turn, sends the information to the user.

One drawback with this technique, and also with other similar hierarchical node structures within a cache resides in the generation of so-called hot spots through nodes that are heavily loaded, because it is necessary for much of the traffic to pass through the higher level node. Furthermore, Internet includes a plurality of smaller, independent networks where the links between these networks often constitute bottlenecks that restrict traffic information.

There is used on the Internet an established protocol designated "the Internet Cache Protocol" (ICP), which is intended to facilitate the coaction of independent networks with other networks and thereby circumvent the hot spot problems.

ICP causes a node to ask a plurality of mutually co-operating nodes if they have the information requested. This can result in hundreds of questions being asked. It is possible that tens of positive answers are obtained, and the first node, that is to say the querying node, must itself decide the node from which the information shall be taken. This may result in the first node attempting to fetch information from a node that is already heavily loaded while other nodes that have the desired information may have free capacity. The answer may also resulting the questioning node going to the server that provides the requested information, in order to obtain this information.

It is known from the publication "A Distributed Internet Cache" by Dean Poey, Department of Computer Science, University of Queensland, 1995, to implement d) above by allowing a higher level node in the hierarchy to inform the first node where the desired information can be found in the hierarchy, whereafter the first node contacts the node that has the desired information requesting the dispatch of said information. This is normally also referred to as pulling, i.e. the asking node pulls the information to itself. This publication also discloses that the first node can, itself, collect the desired information in accordance with e) above.

Reference can also be made to Patent Publication EP-A2-0 618 708 with regard to prior art technique. This publication describes a system of mutually coacting nodes.

According to the technique disclosed in this earlier publication, superordinate nodes (referred to as cache server nodes) store information relating to the resources available in nodes that are connected to themselves in a directory. When receiving an inquiry concerning a specific resource, the node searches for the resource in its own directory. If the information requested is not available, the server node requests the information from coacting server nodes. If none of these server nodes contains the information requested, a general broadcast is made to all nodes in the network. If this general broadcast fails to produce the information requested, the inquiry, or request, is sent to adjacent networks via selected gate nodes.

In this context, it will also be mentioned what is meant in this description by persistent and temporary connections.

In communication in large networks there is used a transmission control protocol (TCP), which is a connection orientated protocol that provides a reliable bit stream within an Internet protocol (IP). According to TCP, a persistent connection implies a guarantee that both ends of a connection will be able to receive all data that is sent from the other end of the connection. According to TCP, the data is received in the same order as that in which it was originally sent and without receiving a duplicate.

Thus, according to TCP, a persistent connection is a logic persistent connection which guarantees transmitter and receiver a correct transmission of data and which need not be a physical persistent connection between transmitter and receiver. In this description, by a persistent connection is meant more specifically a connection that is constantly activated and that if deactivated for some reason or another is again established.

By temporary connection is meant in this description a connection that is established temporarily when transmitting data and is then released upon completion of the transmission. A temporary connection can also be a connection that has already been established for some reason or another and that can be also used for the current transmission. Thus, this connection need not be established or released specifically with respect to the current transmission.

The establishment and release of these connections need not necessarily be physical, but may also be achieved by means of a logic facility that enables one of several possible logic connections to be made in one or more physically established connections.

Irrespective of whether a connection is a persistent or a temporary connection in accordance with this description, it can equally as well be allocated the properties of a persistent connection according to TCP.

SUMMARY OF THE INVENTION

Technical Problems

When considering the prior art as described above, it will be seen that a technical problem resides in the ability to balance the load in a cache node hierarchy, so as to avoid the problems associated with hot spots where one or a few nodes is/are heavily loaded with data transmissions.

Another technical problem resides in the distribution of traffic in a cache so as to prevent the occurrence of bottlenecks, where the transmission capacity in one or more connections limits/limit the total flow of data within or to and from a cache.

Another technical problem is one of deciding the node from which desired information shall be collected when the information requested is found available in a number of nodes in one and the same cache.

Another technical problem is to allocate functions and assignments to cache nodes and to arrange these nodes in relation to one another such that only a very small data quantity need be sent between different nodes in order to satisfy an inquiry or request for specific data-information.

Another technical problem is one of providing a method of handling an inquiry in a manner which takes into account the available transmission capacity and the temporary loading of different nodes.

Still another technical problem is one of providing a protocol according to which inquiries are made within a cache and which provides a specific inquiry and response order in different cases, depending on whether or not the requested information is available in the node to which the user is connection or in another node within the cache, or in a node within another cache, or possibly is only available from the server that provides the information requested.

Another technical problem resides in connecting co-acting cache nodes together in a manner which is advantageous both from the aspect of economy and the aspect of transmission.

Another technical problem is one of providing co-action between different caches.

Another technical problem is one of distributing the traffic occurring between different caches.

Still another technical problem is one of adapting cache nodes for different loads or capacity requirements.

When a cache has been taken into operation, a technical problem resides in the ability to adapt the cache nodes to future capacity requirements, where this requirement may have increased or decreased.

Another technical problem resides in dividing a node into several different functions or services and to allocate to these functions or services that enable the load to be distributed within a node between different services.

Another technical problem is one of adapting these services to those functions or assignments that have been assigned to respective nodes.

Another technical problem is one of implementing respective services in a manner which provides scalability for adapting respective nodes to the capacity required.

Solution

With the intention of solving one or more of the aforesaid technical problems, the present invention takes as its starting point a method, a cache and a node according to known technology as described in the aforegoing, where the cache nodes form a hierarchial tree structure of nodes that includes a plurality of so-called object nodes, a plurality of so-called directory nodes, and a so-called root node.

In this tree structure, the object nodes are positioned furthest out, the root node constitutes the root in the tree structure, and any intermediate levels between an object node and the root node are comprised of directory nodes.

This structure and the division into different nodes enables different assignments to be distributed within a cache, thereby enabling the problems relating to hot spots and bottlenecks to be circumvented or at least considerably reduced.

For the sake of clarity, the information handled in this description has been divided into two types of information, to-wit data-information and meta-information. By data-information is meant the information requested by a user, such as a home page on the Internet. By meta-information is meant information used within the network between different nodes and which points to where the requested data-information is available in the network or in a cache, in several different ways.

A particular feature of the present invention is that the data-information stored in the tree structure is stored solely in the object nodes.

The directory nodes are intended to include a directory of all data-information stored in the object nodes which, in the tree structure, are located beneath respective directory nodes, and within which object nodes respective data-information is stored.

The root node is intended to include a directory of all data-information that is stored in the tree structure and within which object node respective data-information is stored.

The information that points to where the data-information is available is the earlier mentioned meta-information.

With the intention of enabling an inquiry to be handled effectively in a manner which takes into account the transmission capacity available and the load on different nodes at that particular moment in time, it is proposed in accordance with the invention that in the process of requesting for information:

f) the user requests the data-information concerned from a first object node of a number of available object nodes;

g) said first object node sends said data-information to the user when said data-information is available in said first object node;

h) when said data-information is unavailable in said first object node, said first object node requests the data-information from a first directory node located immediately above said first object node in said tree structure;

i) when h) is fulfilled and the data-information requested is available in a second object node located immediately beneath the first directory node in said tree structure and the directory of said first directory node includes the identity of the object node in which said data-information is available, the first directory node orders the second object node, either directly or via possible intermediate directory nodes, to send said data-information to said first object node and that this data-information is sent from the first object node to the user;

j) when step h) is fulfilled and when the requested data-information is available in a third object node that lies beneath a second directory node in the tree structure separate from the first directory node, wherein the directory of said second directory node includes the identity of the object node in which said data-information is found, the first directory node requests said data-information from a further node located immediately above the first directory node in the tree structure;

k) when step j) is fulfilled and said further node is a third directory node located above the second directory node in the tree structure, the third directory node orders the second object node, either directly or via possible intermediate directory nodes, to send the data-information to the firs object node, whereafter said information is sent to the user;

l) when step j) is fulfilled and when the further node is a root node, the root node orders the second object node, either directly or via possible intermediate directory nodes, to send the data-information to said first object node, whereafter said data-information is sent to the user; and m) when said data-information is unavailable in the tree structure, said data-information is collected from the server by the first object node and said data-information then sent to the user.

In one embodiment of the invention, when the requested data-information is available in several different object nodes, the commanding node decides which object node shall send the data-information, on the basis of the current load on the object nodes that contain the requested data-information.

In this case when the data-information requested is found, the object node that contains this information is ordered to send it to the first object node, also known as pushing. In combination with the commanding node issuing its order while taking into account the current load on different object nodes provides a solution to part of the problems concerning the distribution of the total load on the mutually coacting nodes of a cache.

It is also proposed that when the data-information requested is unavailable in the tree structure, the first object node shall collect the requested data-information from the server concerned, therewith distributing the load created by fetching unavailable data-information from between the different object nodes.

It is also proposed in accordance with the present invention that when an object node is ordered to send data-information to the first object node, the commanding node will inform the first object node, either directly or via possible intermediate directory nodes, that the data-information is found within the tree structure, and then when the data-information is unavailable in the tree structure the root node informs the first object node, either directly or via possible intermediate directory nodes, that the data-information is unavailable in the tree structure.

With the intention of ensuring communication between these nodes of a tree structure, it is proposed in accordance with the invention that all cache nodes will communicate with other overlying nodes in the tree structure by means of persistent connections, and that all object nodes will communicate with other object nodes by means of temporary connections, and that solely inquiries, responses to inquiries and meta-information are sent via the persistent connections and data information is sent via the temporary connections.

In order to enable the searching capacity for requested information to be broadened, it is proposed in accordance with the invention that a first root node of a cache is able to co-operate with a second root node belonging to another cache, and that respective root nodes include a directory that contains all data-information available in said co-operating root nodes.

According to one embodiment of the invention, co-operating root nodes are mutually connected to a common service node via persistent connections, said service node functioning to direct traffic between mutually co-operating root nodes.

With the intention of providing a scaleable node that can be readily adapted to prevailing capacity requirements and that is able to handle high loads, it is proposed in accordance with the invention that each node will include four kinds of services, to wit data services, scheduling services, logic services and management services.

The data services store information, the scheduling services distribute incoming inquiries from users to different logic services and sends responses from the logic services to the users, the logic services search for and handle information in accordance with requests, and the management services handle information with regard to information updates, the information that shall be stored, the duration of such storage and under which conditions, and so on.

When a node is an object node, the information consists of both data-information and meta-information concerning the own node.

When necessary, the logic service in the object node takes data-information from the server that can provide such information. The data-information taken from the server is stored in the data services in accordance with guidelines from the management services. Meta-information relating to said data-information is stored in the data services and replicated in overlying directory nodes or root nodes in the tree structure, via the scheduling services. The logic services then send the data-information to the user.

In response to a command to send the data-information to a first object node, the logic services fetch data-information from the data services belonging to the own node, and send this data-information to the logic services of the first object node.

The logic services belonging to the first object node thus store received data-information in the data services belonging to the own node in accordance with guidlines from the management services belonging to the own node, whereafter the logic services belonging to the first object node store meta-information relating to the data-information in the data services. The logic services belonging to the first object node cause the meta-information to be replicated in the overlying directory node or root node in the tree structure via the scheduling services, whereafter a logic service belonging to the first object node sends said data-information to the user.

When a node is a root node or a directory node, solely meta-information is concerned.

Respective services are implemented with the aid of a processor unit and associated means that carry out the service concerned. Scalability in a node is achieved by virtue of enabling a plurality of processor units to operate in parallel within respective kinds of services.

It is also possible to allow a processor unit to provide a plurality of services within one kind of service, or to allow a processor unit to provide a plurality of services within different kinds of services.

When needing to increase or decrease the available capacity of a node, by adding processor units to or removing processor units from the node and optionally causing the additional processor units to act as one or more service facilities according to one or more kinds of services.

The present invention can be applied to particular advantage in large networks, such as the broad network Internet, where it is appropriate for a cache to be handled by an operator active on the Internet.

Advantages

Those advantages that are primarily afforded by an inventive method, cache or node reside in the provision of a cache that enables requests for specific data-information to be handled simply, quickly and positively, where the nodes active within the cache and the capacity of said nodes can be managed in a beneficial manner from the aspect of capacity so that hot spots and bottlenecks can be avoided to a large extent.

The present invention provides nodes that can be scaled to suit requirements, which may change with time. The node structure also enables the load to be distributed between different processor units within the node.

The main characteristic features of the inventive method are set forth in the characterizing clause of the following claim 1, while the main characteristic features of an inventive cache are set forth in the characterizing clause of the following claim 17, and the main characteristic features of an inventive node are set forth in the characterizing clause of the following claim 22.

BRIEF DESCRIPTION OF THE DRAWINGS

A method, a cache, and a node having features characteristic of the present invention will now be described in more detail by way of example with reference to the accompanying drawings, in which.

DESCRIPTION OF PROPOSED EMBODIMENTS

Figure 1:
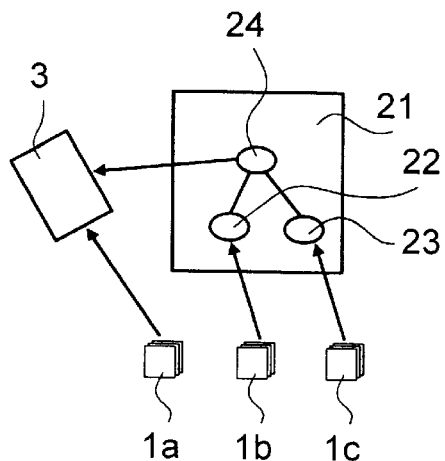
FIG. 1 is a schematic, highly simplified illustration of a large network, showing a user, a cache, and a server.

FIG 1 is a highly simplified illustration of the fundamental requirements of the present invention. The Figure shows three different users $1a$, $1b$, $1c$ connected to a large network A. User $1a$ in FIG. 1 seeks data-information that is available in a server 3 somewhere in the network A. This is effected by user $1a$ making direct contact with the server 3. By direct contact is not necessarily meant a direct physical line, but can often mean that the contact passes via number of different nodes in the network A.

Direct contact with a server is often unsuitable, since it will frequently involve a long communications route through many different bottlenecks and hot spots. If all users seeking this particular data-information go directly to the server that provides said data-information, when the data-information concerned is much sought after, the server itself will become a hot spot and the connections leading to he server will become bottlenecks.

User $1b$ in FIG. 1 searches for the same data-information and enters a request for said information via a cache 21. The cache checks for the availability of the requested data-information in one of the nodes 22, 23, 24 included in the cache 21. If the information is unavailable, the data-information is fetched from the server 3 to the cache 21 and there stored and sent to the user $1b$.

The user $1c$ in FIG. 1 also requests for the same data-information. In this case, the data-information is stored in the cache 21 and the user $1c$ is therefore able to receive the data-information requested from the cache without needing to load the server 3 and without needing to fetch the data-information from the large network A. This gives faster handling of the request, or inquiry, and a quicker response on the part of user $1c$.

Handling of requests, or inquiries, for data-information within a network A where the request is handled by a cache 21, thus comprises the steps in which a) a user $1b$ asks to be provided with data-information from a first node 22 of the number of nodes 22, 23, 24 in the cache 21;

b) when said data-information is available in the first node 22, the data-information is sent to the user $1b$;

c) when the data-information is unavailable in the first node 22, the first node inquires after the data-information in the nodes 23, 24, belonging to the cache 21;

d) when step c) is fulfilled and data-information is available in the cache 21, said data-information is sent to the user $1b$; and e) when c) is fulfilled and the data-information is unavailable in the cache 21, the data-information is fetched from the server 3 to the cache 21 and thereafter sent to the user $1b$.

Subsequent to having been fetched from the server 3 to the cache 21, the data-information is stored in the cache and is made available within the cache 21 for a given period of time, so as to be available for any other requests made for this information.

Figure 2:
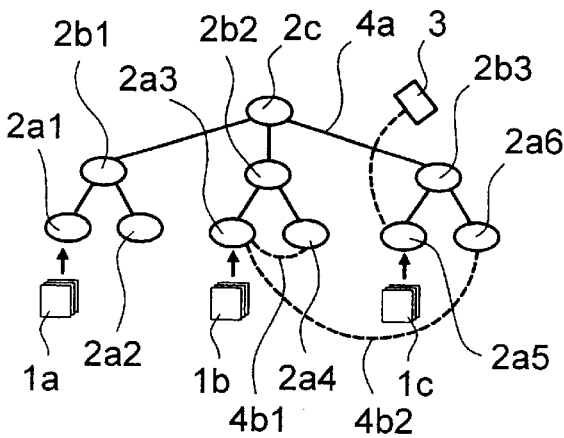
FIG. 2 illustrates schematically an hierarchical structure for nodes included in an inventive cache.

As will be seen from FIG. 2, nodes 2a1, 2a2, 2a3, 2a4, 2a5, 2a6, 2b1, 2b2, 2b3, 2c belonging to a cache 2 form a hierarchical tree structure.

This tree structure includes a number of so-called object nodes 2a1, 2a2, 2a3, 2a4, 2a5, 2a6, a number of so-called directory nodes 2b1, 2b2, 2b3, and a so-called root node 2c.

The object nodes 2a1, 2a2, 2a3, 2a4, 2a5, 2a6 are positioned furthest out in the tree structure, and the root node 2c constitutes the root of the tree structure. Possible intermediate levels between an object node and the root node are comprised of directory nodes 2b1, 2b2, 2b3.

FIG. 2 shows a tree structure that includes one level of directory nodes between the root node and the object nodes. The tree structure shown in FIG. 2 is merely an explanatory example and it will be understood that a tree structure may be much larger and have different configurations in the practical application of the present invention, all in accordance with prevailing requirements.

The data-information stored in the tree structure is stored solely in the object nodes 2a1, 2a2, 2a3, 2a4, 2a5, 2a6. Respective directory nodes 2b1, 2b2, 2b3 include a directory which covers all data-information stored in object nodes that are located in the tree structure beneath respective directory nodes, and in which object nodes respective data-information is stored. The root node 2c includes a directory covering all data-information stored in the total tree structure, and the identity of the object node in which respective data-information is stored. The information that points to where data-information is available is referred to here as meta-information in order to distinguish this information from the requested, so-called data-information.

Against this background, the present invention provides a method of handling a request for data-information. This method utilizes an inventive cache and an inventive node.

Handling of a request for data-information will now be described with reference to several different situations.

When a user 1a asks for data-information, the following steps are taken:
f) the user 1a requests the data-information concerned from a first object node 2a1 of a number of available object node; and
g) when said data-information is available in said first object node 2a1, the data-information is sent to the user 1a.

When a user 1b requests data-information from a first object node, which in this case is the object node 2a3, the following steps are taken:
h) when data-information is unavailable in the first object node 2a3, the first object node 2a3 requests the data-information from a first directory node 2b2 which lies directly above the first object node 2a3 in the tree structure;
i) when step h) is fulfilled and the data-information is available in a second object node 2a4 which lies beneath the first directory node 2b2 in the tree structure, and the directory of the first directory node 2b2 includes information of the identity of the object node 2a4 in which the data-information is found, the first directory node 2b2 commands the second object node 2a4, either directly or via possible intermediate directory nodes, to send the data-information to the first object node 2a3 by means of a connection 4b1, whereafter the data-information is sent to the user 1b.

When a user 1b requests data-information from a first object node, which in the illustrated case is the object node 2a3, the following procedural steps are taken:
j) when step h) is fulfilled and said data-information is available in a third object node 2a6 which lies beneath a second directory 2b3 separate from the first directory node 2b2 in the tree structure and the directory of this second directory node 2b3 includes information as to which object node 2a6 the data-information is available, the first directory node 2b2 requests the data-information from a further node that is located directly above the first directory node 2b2 in the tree structure;
k) when step j) is fulfilled and the further node is a third directory node that is located above the second directory node in the tree structure, the third directory node orders the second object node, either directly or via possible intermediate directory nodes to send data-information to the first object node, whereafter said data-information is sent to the user; and
l) when step j) is fulfilled and said further node is comprised of the root node 2c, the root node 2c orders the second object node 2a6, either directly or via possible intermediate directory nodes 2b3, to send the data-information to the first object node 2a3 by means of a connection 4b2, whereafter the data-information is sent to the user 1b.

When a user 1c asks for data-information from a first object node which, in the illustrated case, is the object node 2a5, the following procedural step is taken:
m) when the data-information is unavailable through the tree structure, the data-information is fetched from the server 3 by the first object node 2a5, whereafter said data-information is sent to the user 1c.

Step k) is not explicitly shown in FIG. 2, since the node that is superordinate to the further node in the Figure is comprised of a root node according to step l). However, the person skilled in this art will readily understand how step k) is implemented in a tree structure that has two or more levels of directory nodes in one of the branches of the tree structure.

Figure 3:
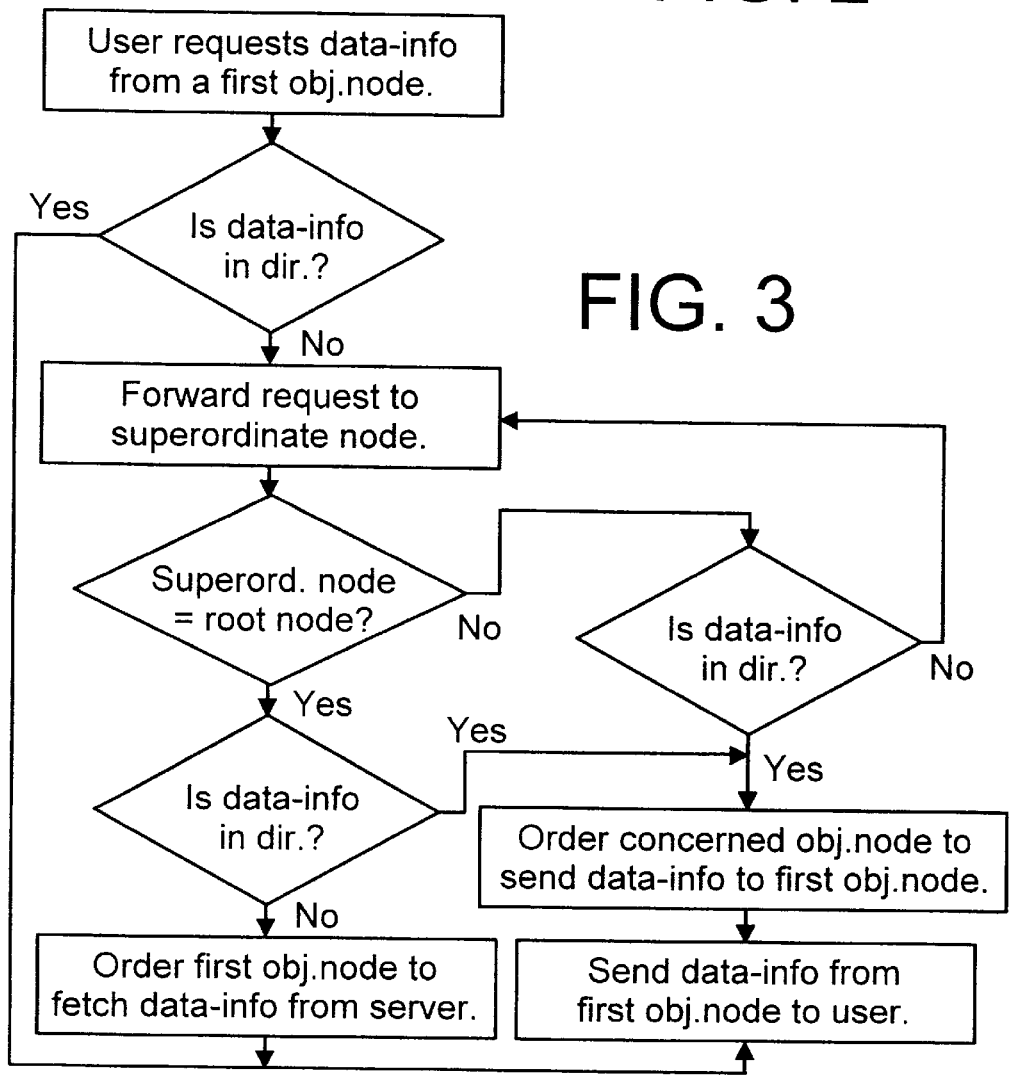
FIG. 3 is a flowchart illustrating the basic method of requesting data-information in a cache.

FIG. 3 is a flowchart that illustrates steps f) to m). This flowchart also illustrates step k).

When the requested data-information is available in a plurality of different object nodes 2a5, 2a6, the commanding node 2b3 may be allowed to decide which object node 2a6 shall send the data-information, on the basis of the current loading of those object nodes that contain said requested data-information.

When an object node 2a6 is ordered to send data-information to a first object node 2a3, the commanding node 2b3 informs the first object node 2a3, either directly or via possible intermediate directory nodes, that said data-information is available within the tree structure.

When the data-information requested is unavailable in the tree structure, the root node 2c informs the first object node 2a3, that the data-information is unavailable in the tree structure, either directly or via possible intermediate directory nodes 2b2.

FIG. 2 also shows that all cache nodes communicate with overlying nodes in the tree structure by means of persistent connections 4a, shown in full lines.

All object nodes communicate with other object nodes by means of temporary connections 4b1, 4b2, as shown in broken lines. Communication between the various object nodes takes place only in the transmission of data-information from one object node to another.

Solely inquiries, answers to inquiries, and meta-information are sent via the persistent connections 4*a*, whereas data-information is sent via temporary connections 4*b*.

Figure 4:
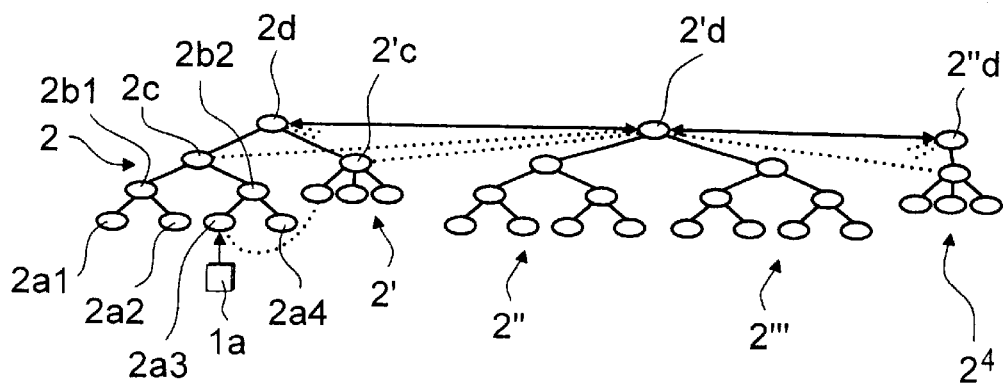
FIG. 4 is a schematic illustration of the co-operation between five different caches.

As illustrated in FIG. 4, a first root node 2*c* of a first cache 2 may be allowed to co-operate with a second root node 2'*c* belonging to a second cache 2'.

In the illustrated case, each root node 2, 2' includes a respective directory that contains all data-information found available in root nodes belonging to co-operating caches.

Thus, this meta-information contains solely the data-information that is available within co-operating caches and within which of these co-operating caches respective data-information is found. The meta-information relating to other caches does not include pointers as to where in the other cache the data-information requested is found, and neither how many copies of said requested data-information may be found in the cache.

Thus, in conjunction with an inquiry, or request, from a first root node 2*c* to a second root node 2'*c* concerning certain data-information, the second root node 2'*c* determines which object node in the own tree structure shall send the data-information.

FIG. 4 also shows that all co-operating root nodes 2*c*, 2'*c* are connected to each other via persistent connections 4*a* with a common service node 2*d* whose function is to direct traffic between co-operating root nodes.

FIG. 4 also shows that several service nodes 2*d*, 2*d*', 2*d*" can be allowed to coact so as to enable several more caches 2, 2', 2", 2''', 2⁴ and their respective root nodes to co-operate with one another.

It will be understood in this regard that when the data-information requested in a first cache 2 is available from an object node 2'*a*1 in a second cache 2', through the route of a service node 2*d*, meta-information to this effect is found in the directory of the root node 2*c* in the first cache 2, and consequently the data-information requested is considered to be available through the tree structure, meaning that the condition of step m) is not fulfilled and that the route node 2*c* can order the object node 2'*a*1 concerned to send said data-information to the first object node 2*a*3 by requesting the data-information from the second root node 2'*c* which, in turn, orders the object node 2'*a*1 concerned to send the data-information to the first object node 2*a*3.

Figure 5:
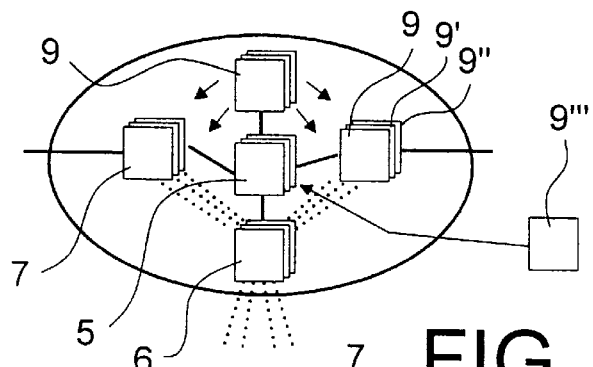
FIG. 5 is a schematic illustration of the principle construction of a node belonging to a cache.

According to the present invention, and as illustrated in FIG. 5, each node includes four kinds of services, these being data services 5, scheduling services 6, logic services 7 and management services 8.

The data services 5 store information, the scheduling services 6 distribute incoming inquiries from user to different logic services 7, and forward responses from the logic services 7 to the users, the logic services 7 search for and handle information related to the inquiry concerned, and the management services 8 handle the information with regard to updating said information, deciding which information shall be stored, the duration of such storage, the conditions of such storage, and so on.

The services in the different kinds of nodes function in slightly different ways.

The information in an object node relates to both data-information and meta-information concerning the own node. The logic services 7 in the object node have the additional function of fetching data-information from the server providing said information, when necessary. The logic services 7 also store the collected data-information in the data services 5 in accordance with guidelines from the management services 8. Meta-information relating to the data-information is also stored in the data services 5 and replicated to overlying directory nodes or root nodes in the tree-structure, via the scheduling services 6. The logic services 7 also have the function in the object nodes of sending said data-information to the user.

In response to a command to send data-information to a first object node, the logic services 7 fetch the data-information from the data services 5 belonging to the own node and transmit the data-information collected to logic services belonging to the first object node.

The logic services 7 belonging to the first object node thus store received data-information in the data services 5 belonging to the own node in accordance with guidelines from the management services 8 belong to the own node. Meta-information relating to the data-information is also stored in the logic services 7 belonging to the first object node in the data services 5 and is replicated in overlying directory nodes or root nodes in the tree structure, via the scheduling services 6.

The logic services 7 belonging to the first object node have the function of sending the data-information to the user also in this case.

Information in a root node or a directory node relates solely to meta-information.

As illustrated in FIG. 5, respective services can be implicated by using a processor unit 9 and associated units to carry out the services, and by causing a plurality of processor units 9, 9', 9" to operate in parallel within respective kinds of services.

Figure 6A:
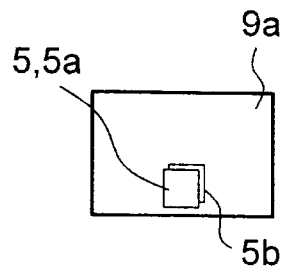
FIGS. 6a and 6b illustrate schematically how a processor unit can provide a plurality of different services.
Figure 6B:
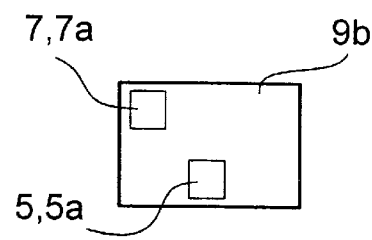

As shown in FIG. 6, a processor unit 9*a* may be allowed to provide a plurality of services 5*a*, 5*b* in one kind of service 5, according to FIG. 6*a*, or to allow a processor unit 9*b* to provide a plurality of services 5*a*, 7*a* in different kinds of services 5, 7, according to FIG. 6*b*, depending on the capacitor of the processor unit 9*a*, 9*b* concerned and depending on the capacity requirement of respective services.

When needing to increase or decrease the available capacity of a node, the node is scaled to the capacity desired by adding processor units to or removing processor units from the node concerned, and by optionally allocating to the additional processor units the function of acting as one or more services in accordance with one or more kinds of services.

In FIG. 5 this is illustrated by increasing the data services 5 by adding one processor unit 9''' to the node and allocating this added processor unit the function of acting as a data service 5.

In the case of applications where security is of great importance, it may be suitable to allow respective services to be implemented by a processor unit, so as to thereby increase security should one of the processor units malfunction.

Figure 7:
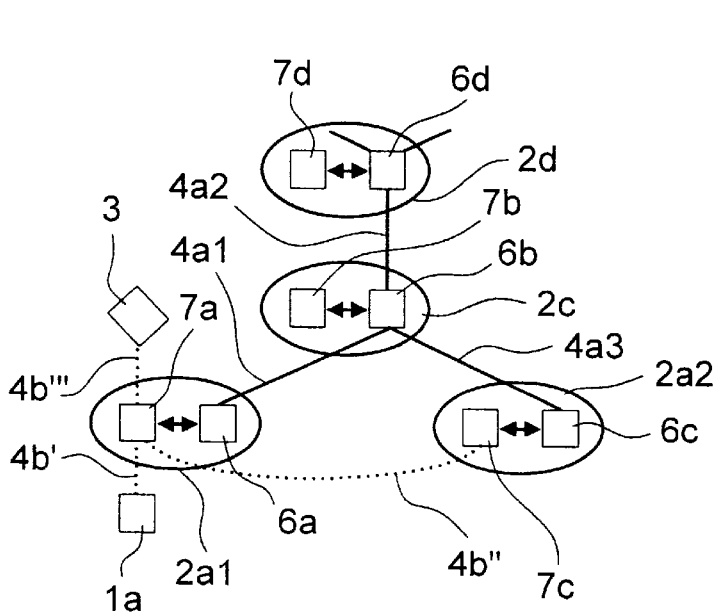
FIG. 7 illustrates schematically the type of connections that interconnect the nodes of a cache.

FIG. 7 illustrates the various connections that are active between the nodes in a tree structure according to the present invention, where persistent connections are shown in full lines 4*a* and temporary connections are shown in broken lines.

In FIG. 7 illustration, a user 1*a* is connected to the logic service 7*a* belonging to a first object node 2*a*1 by means of a temporary connection 4*b*'. All scheduling services 6*a*, 6*b*, 6*c*, 6*d* are connected to one another by means of persistent connections 4*a*1, 4*a*2, 4*a*3.

When data-information shall be transmitted from an object node 2*a*2 to the first object node 2*a*1, the transmission is effected with the aid of a temporary connection 4*b*" between the logic services 7*c* and 7*a* of the two nodes.

When the first object node 2*a*1 shall fetch data-information from a server 3, it does so with the aid of a temporary connection 4*b*'''.

In this way, all nodes have contact with superordinate nodes by means of persistent connections that guarantee good communication within the cache. Respective scheduling services then distribute incoming inquiries to the logic service within the own node that has the least load at that moment in time.

Persistent connections transmits solely meta-information, inquiries and replies to inquiries, whereas temporary connections are used for the transmission of data-information.

For the sake of clarity, the three different basic cases of inquiries will be described with a more detailed explanation of the functions of the various services in the inquiry process.

Figure 8:
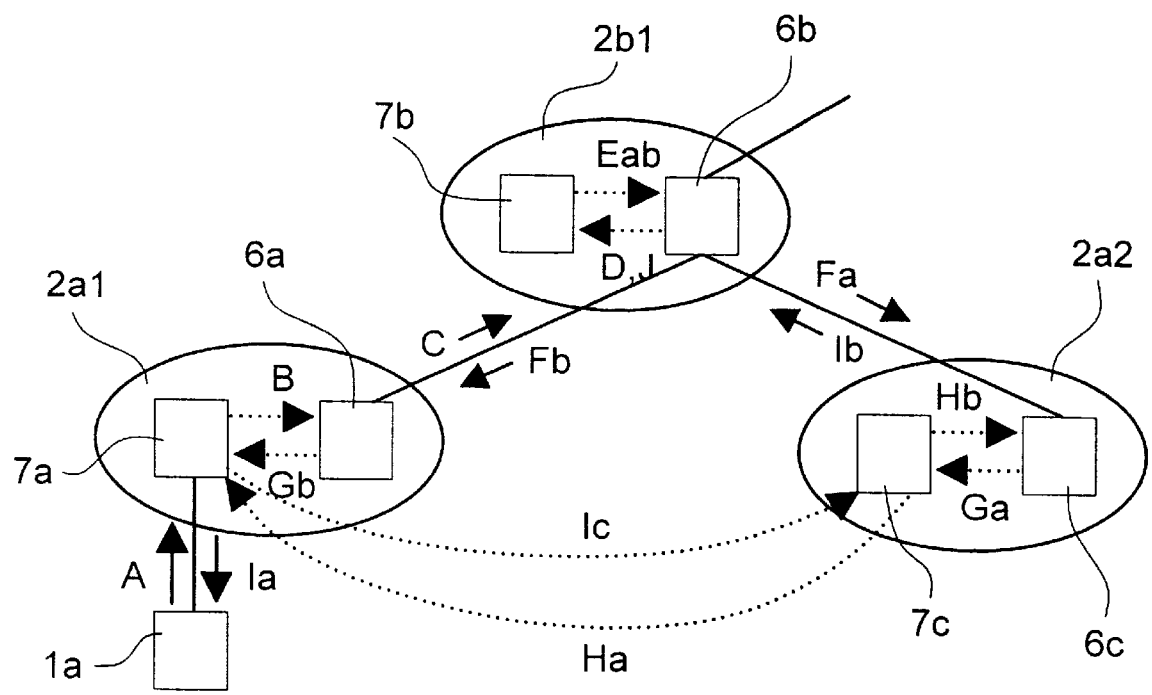
FIG. 8 is a schematic illustration of a first example of a procedure followed in response to a request in a cache.

FIG. 8 is an illustration of an inquiry when the data-information requested is available in an object node $2a2$ that is located immediately beneath the same directory node $2b1$ as the first object node $2a1$.

This inquiry comprises the following steps:

A: A user $1a$ establishes a connection with the cache 2 and is allocated a connection to a specific node, a first object node $2a1$, where the actual connection is effected with a temporarily available logic service $7a$. The connection $4b$ is a temporary connection. The user $1a$ requests for specific data-information. The logic service $7a$ checks if the requested data-information is available in the own node $2a1$.

B: When the data-information requested is not available in the own node, the data-information is requested from a superordinate node, first via the scheduling service $6a$ of the own node.

C: The scheduling service $6a$ forwards the request to a superordinate node $2b1$ and has there a persistent connection with one of the scheduling services $6b$ belonging to the superordinate node $2b1$.

D: The scheduling service $6b$ belonging to the superordinate node $2b1$ sends the request to the least loaded logic service $7b$ belonging to the superordinate node $2b1$.

Ea: The logic service $6b$ sends an order intended for the object $2a2$ that contains the data-information requested, commanding said object node to send the data-information. The order is sent to the scheduling service $6b$ belonging to the own node $2b1$.

Eb: The logic service $7b$ sends a message intended for the logic service $7a$ that sent the original inquiry to the effect that the data-information is available in the cache.

Fa: The scheduling service $6b$ forwards the order Ea to the scheduling service $6c$ belonging to the object node $2a2$ that contains the data-information concerned.

Fb: The scheduling service $6b$ forwards the message Eb to the scheduling service $6a$ belonging to the first object node $2a1$.

Ga: The scheduling service $6c$ sends the order Ea to the least loaded logic service $7c$ in the own node.

Gb: The scheduling service $6a$ sends the message Eb to the logic service $7a$ concerned in the own node.

Ha: The data-information requested is pushed from the logic service $7c$ to the logic service $7a$ belonging to the first object node.

Hb: The logic service $7c$ sends a confirmation message to the effect that the data-information has been pushed to the scheduling service $6c$ in the own node.

Ia: The data-information is sent from the logic service $7a$ to the user $1a$.

Ib: The confirmation message Hb is sent to the scheduling service $6b$ belonging to the superordinate node $2b1$.

Ic: The logic service $7a$ belonging to the first object node $2a1$ confirms the receipt of said data-information.

J: The confirmation message Hb is sent to the logic service $7b$ in the own node from the scheduling service $6b$ belonging to the superordinate node $2b1$.

In this particular case, the superordinate node $2b1$ is a directory node.

Figure 9:
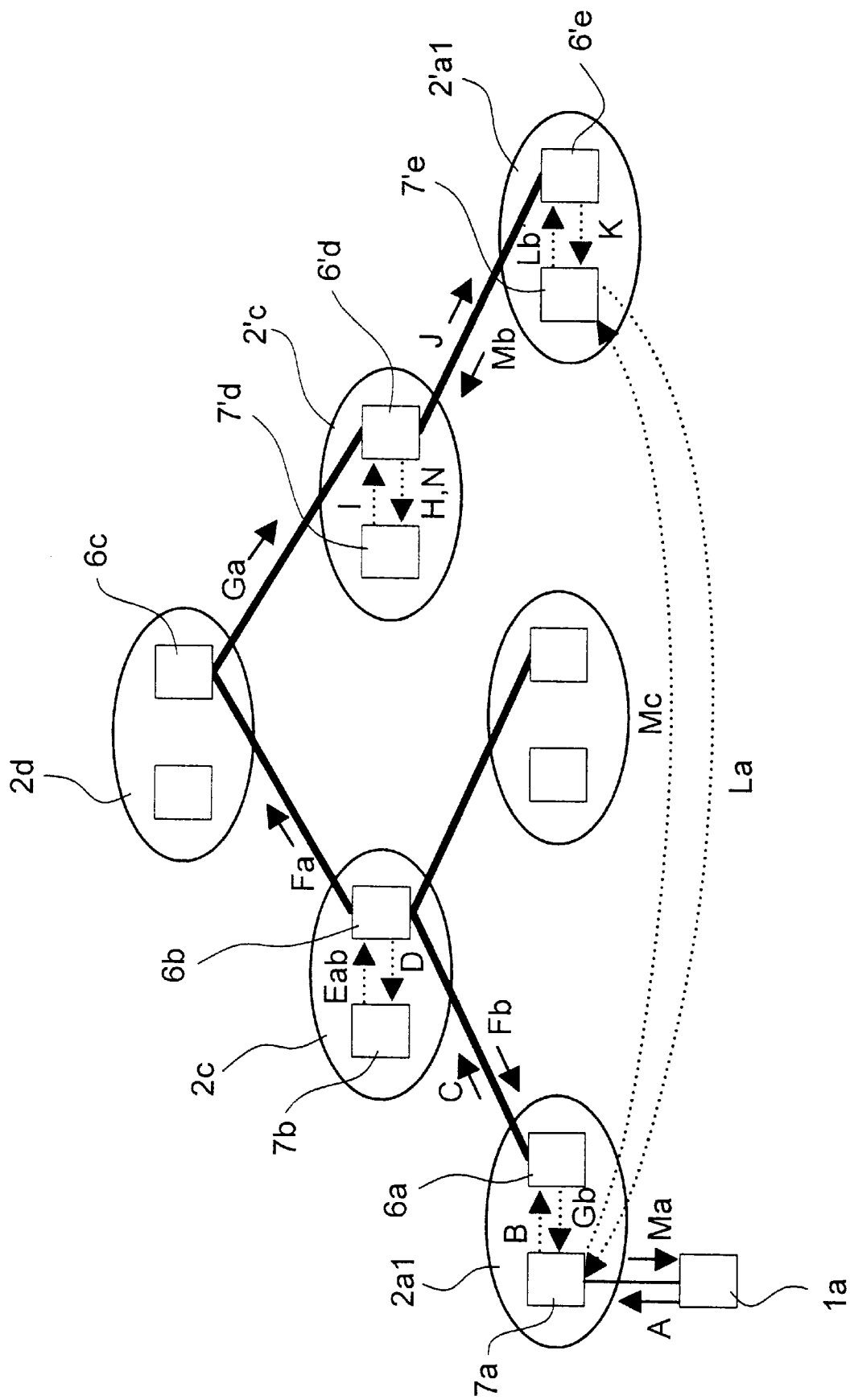
FIG. 9 is a schematic illustration of a second example of a alternative procedure followed in response to a request, or inquiry, between two caches.

FIG. 9 illustrates an inquiry when the requested data-information is available in an object node $2'a1$ belonging to a second cache $2'$, where a first cache 2 co-operates with the second cache $2'$ via a service node $2d$.

This inquiry includes the following process steps:

A: A user $1a$ establishes a connection with the cache 2 and is allocated a connection to a specific node, a first object node $2a1$, where the virtual connection is effected with a temporarily available logic service $7a$. The connection $4b$ is a temporary connection. The user $1a$ requests specific data-information. The logic service $7a$ checks if the requested data-information is available in the own node $2a1$.

B: When the requested data-information is unavailable in the own node, the data-information is requested from a first superordinate node, first via the scheduling service $6a$ of the own node.

C: The scheduling service $6a$ forwards the inquiry to the first superordinate node $2c$ and has there a persistent connection with one of the scheduling services $6b$ belonging to the first superordinate node $2c$.

D: The scheduling service $6b$ belonging to the first superordinate node $2c$ sends the inquiry to the least loaded logic service $7b$ belonging to the first superordinate node $2c$.

Ea: When the requested data-information is unavailable in the own node but, according to meta-information, is available in the co-operating cache $2'$, the logic service $7b$ requests the data-information from the service node $2d$, first via the scheduling service $6b$ of the own node.

Eb: The logic service $7b$ sends a message intended for the logic service $7a$ that sent the original inquiry, to the effect that the data-information is available.

Fa: The scheduling service $6b$ forwards the inquiry Ea to a scheduling service $6c$ belonging to the service node $2d$.

Fb: The scheduling service $6b$ forwards the message Eb to the scheduling service $6a$ belonging to the first object node $2a1$.

Ga: The scheduling service $6c$ belonging to the service node $2d$ forwards the inquiry Ea to a scheduling service $6'd$ belonging to a second superordinate node $2'c$ which is superior in status to the object node $2'a1$ that has the requested data-information.

Gb: The scheduling service $6a$ sends the message Eb to the logic service $7a$ concerned in the own node.

H: A scheduling service $6'd$ belonging to the second superordinate node $2'c$ forwards the inquiry Ea to the least loaded logic service $7'd$ belonging to the second superordinate node $2'c$.

I: The logic service $7'd$ sends an order addressed to the object node $2'a1$ that has the data-information requested, commanding the node to send said data-information. The order, or command, is sent to the scheduling service $6'd$ belonging to the own node $2'c$.

J: The scheduling service $6'd$ forwards the order I to the scheduling service $6'e$ belonging to the object node $2'a1$ that has the data-information requested.

K: The scheduling service 6'e sends the order I to the least loaded logic service 7'e in the own node.

La: The data-information concerned is pushed from the logic service 7'e to the logic service 7a belonging to the first object node.

Lb: The logic service 7'e sends a confirmation message to the effect that the data-information has been pushed to the scheduling service 6'e in the own node.

Ma: The data-information is sent from the logic service 7a to the user 1a.

Mb: The confirmation message Lb is sent to the scheduling service 6'e belonging to the second superordinate node 2'c.

Mc: The logic service 7a belonging to the first object node 2a1 confirms the receipt of the data-information.

N: The confirmation message Lb is sent to the logic service 7'd in the own node from the scheduling service 6'd belonging to the second superordinate node 2'c.

In this case, the first and the second superordinate nodes 2c, 2'c are root nodes.

Figure 10:
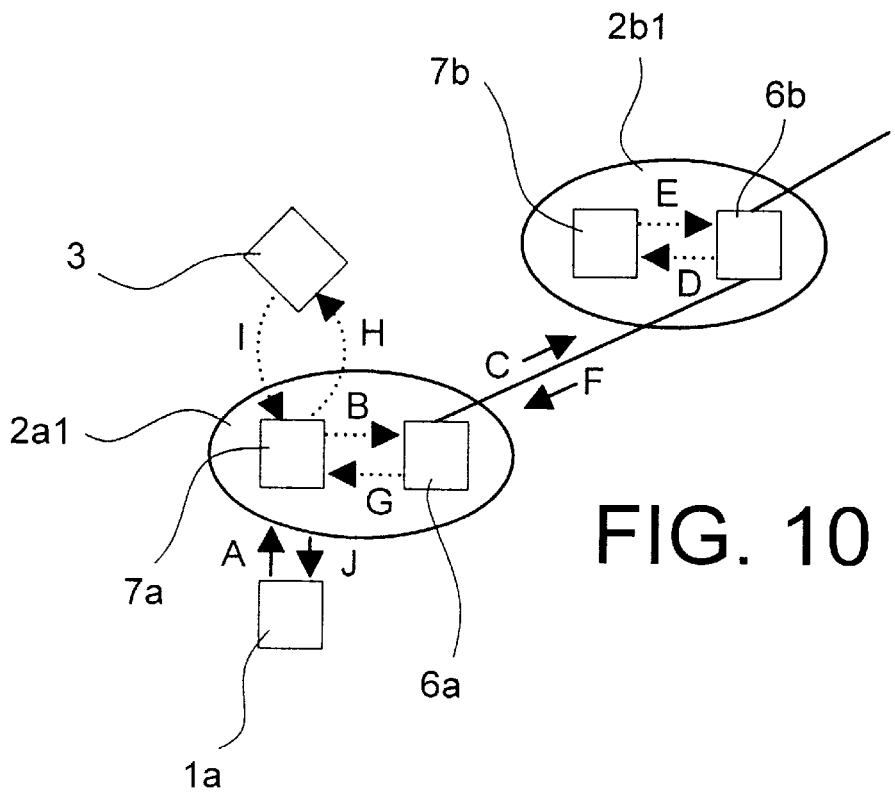
FIG. 10 is a schematic illustration of a third example of a procedure followed in response to a request, or inquiry, in a cache.

FIG. 10 illustrates the procedure carried when the requested data-information is not available. in the cache.

This procedure comprises the following steps:

A: A user 1a establishes a connection to the cache 2 and is allocated a connection with a specific node, a first object node 2a1, wherein the virtual connection is effected with a temporarily available logic service 7a. The connection 4b is a temporary connection. The user 1a inquires after specific data-information. The logic service 7a checks if the data-information requested is available in the own node 2a1.

B: When the requested data-information is not available in the own node, the data-information is requested from a superordinate node, first via the scheduling service 6a of the own node.

C: The scheduling service 6a forwards the inquiry to a superordinate node 2c and has there a persistent connection with one of the scheduling services 6b belonging to the superordinate node 2c.

D: The scheduling service 6b belonging to the superordinate node 2c sends the inquiry to the least loaded logic service 7b belonging to the superordinate node 2c.

E: The logic service 7b sends a message addressed to the logic service 7a that sent the ordinal inquiry, to the effect that the data-information is unavailable.

F: The scheduling service 6b forwards the message E to the scheduling service 6a belonging to the first object node 2a1.

G: The scheduling service 6a sends the message E to the logic service 7a concerned in the own node.

H: The logic service 7a requests the data-information from the server 3 that provides said information.

I: Data-information is sent from the server 3 to the logic service 7a.

J: Data-information is sent from the logic service 7a to the user 1a.

In this particular case, the superordinate node 2c is a root node.

The present invention is particularly beneficial in large networks, such as the internationally extended network Internet. In this particular application, it is suitable for a cache to be managed by an operator active on Internet, which provides the operator with the advantages of a powerful, scaleable and user-friendly cache.

On Internet, the data-information will often comprise home pages and inquiries are made with the aid of an HTTP address.

Another possible application of the present invention is its use in telecommunications networks.

It will be understood that the invention is not restricted to the aforedescribed and illustrated exemplifying embodiments thereof and that modifications can be made within the scope of the inventive concept as apparent from the following claims.

What is claimed is:

1. A method of dealing with inquiries that concern data-information in a network that includes a plurality of users who ask to be provided with said data-information, a plurality of servers which provide said data-information, and at least one cache active between said servers and users, containing newly used data-information, and wherein said cache includes a plurality of nodes, in which method a) the user requests the data-information concerned from a first node of said plurality of nodes;

b) when the data-information requested is available in said first node, said data-information is sent to said user;

c) when said data-information is unavailable in said first node, said first node requests said data-information from said nodes belonging to said cache;

d) when step c) is fulfilled and the data-information is available within the cache, the data-information is sent to said user;

e) when c) is fulfilled and said data-information is unavailable in said cache, the data-information is fetched from said server and deliver to said cache, whereafter said data-information is sent to said user;

wherein subsequent to having been fetched from said server, said data-information is stored in said cache for a given period of time so as to be available for requests and inquiries from further users, wherein the nodes belonging to the cache form a hierarchial tree structure of nodes that includes a plurality of so-called object nodes, a plurality of so-called directory nodes, and a so-called root node, wherein said object nodes are positioned furthest out in said tree structure, wherein said root node forms the root of said tree structure, wherein possible intermediate levels between an object node and said root node are comprised of directory nodes, wherein data-information stored in said tree structure is stored solely in said object nodes, wherein respective directory nodes include a directory that covers all data-information stored in object nodes that are located beneath said directory nodes in said tree structure and in which object nodes respective data-information is stored, wherein said root node includes a directory of all data-information stored in said tree structure and in which object nodes respective data-information is stored, where information that discloses which data-information is available and where said information is available is designated meta-information, in which method f) the user requests data-information concerned from a first object node of said plurality of object nodes;

g) the data-information is sent to said user when said data-information is available in said first object node;

h) said first object node requests said data-information from a first directory node that lies directly above said first object node in said tree structure, when said data-information is unavailable in said first object node;

wherein the information inquiry procedure is i) when step h) is fulfilled and said data-information is available in a second object node that is located beneath said first directory node in said tree structure, wherein the directory belonging to said first directory node includes data which points to the object node in which said data-information is available, said first directory node orders said second object node, directly or via possible intermediate directory nodes, to send said data-information to said first object node, whereafter said data-information is sent to said user;

j) when step h) is fulfilled and said data-information is available in a third object node that lies beneath a second directory node separate in said tree structure from said first directory node, where said directory belonging to said second directory node includes data which points to the object node in which said data-information is available, said first directory node requests said data-information from a further node that lies directly above said first directory node in said tree structure;

k) when step j) is fulfilled and said further node is comprised of a third directory node that lies above said second directory node in said tree structure, said third directory node orders said second object node, directly or via possible intermediate directory nodes, to send data-information to said first object node, whereafter said data-information is sent to said user;

l) when step j) is fulfilled and said further node is comprised of said root node, the root node orders said second object node, directly or via possible intermediate directory nodes, to send said data-information to said first object node, whereafter said data-information is sent to said user;

m) when said data-information is unavailable in the tree structure, the data-information is fetched from said server by said first object node, whereafter said data-information is sent to said user, and that when the requested data-information is available in a plurality of different object nodes, the commanding node decides which object node shall send the data-information, on the basis of the current load on those object nodes that contain the requested data-information.

2. A method according to claim 1, wherein when an object node is ordered to send data-information to said first object node, the commanding node informs, directly or via possible intermediate directory nodes, the first object node that said data-information is available within the tree structure; and in that when said data-information is unavailable through said tree structure, the root node informs the first object node, directly or via possible intermediate directory nodes, that said data-information is unavailable in the tree structure.

3. A method according to claim 1, wherein all nodes belonging to a cache communicate with overlying nodes in said tree structure by means of persistent connections; in that all object nodes communicate with other object nodes by means of temporary connections; in that solely inquiries, answers to inquiries, and meta-information are sent via said persistent connections; and in that data-information is sent via said temporary connections.

4. A method according to claim 1, where a first and a second cache are active within one and the same network, wherein a first root node belonging to said first cache co-operates with a second root node belonging to said second cache; in that respective root nodes include a directory that covers all data-information which is available in said second root node of said tree structure through meta-information belonging to said second, co-operating root node.

5. A method according to claim 4, wherein all co-operating root nodes are connected to one another via persistent connections with a common service node; and in that said service node directs the traffic between co-operating root nodes.

6. A method according to claim 1, wherein each of said nodes includes four kinds of services, i.e. data services, scheduling services, logic services and management services; in that said data services store information; in that, when necessary, said scheduling services distribute incoming inquiries between logic services belonging to different nodes and forward responses from logic services belonging to different nodes; in that logic services seek and handle the requested information; and in that said management services handle said information with respect to information updating, when the information shall be stored, the duration of such storage, and under which conditions, and so on.

7. A method according to claim 6, wherein each of said nodes is comprised of an object node; in that said information relates both to data-information and meta-information concerning the own node.

8. A method according to claim 7, wherein when necessary, said logic service fetches data-information from said server, stores the fetched data-information in said data service in accordance with guidelines from said management service, stores meta-information relating to said data-information in said data service; replicates said meta-information in an overlying directory node or root node in said tree structure, via said scheduling service; and sends said data-information to said user.

9. A method according to claim 7, wherein in response to an order to send data-information to a first object node, said logic service fetches data-information from said data service belonging to the own node, sends thus fetched data-information to a logic service belonging to said first object node; in that logic services belonging to said first object node store the thus received data-information in said data services belonging to the own node in accordance with guidelines from said management services belonging to the own node in accordance with guidelines from said management services belonging to the own node; in that logic services belonging to said first object node store meta-information relating to data-information in said data services; in that logic services belonging to said first object node replicate said meta-information in overlying directory nodes or root nodes in said tree structure via said scheduling services; and in that logic services belonging to said first object node send said data-information to said user.

10. A method according to claim 6, wherein said node is comprised of a root node or a directory node; and in that said information is concerned solely with meta-information.

11. A method according to claim 6, wherein respective services are implemented by carrying out said services with a respective processor unit and associated units; and in that a plurality of processor units operate in parallel with respective kinds of services.

12. A method according to claim 6 or claim 11, wherein a processor unit provides a plurality of services in one kind of service.

13. A method according to claim 6, further comprising a processor unit provides a plurality of services within different kinds of services.

14. A method according to claim 11, wherein when needing to increase or decrease available capacity, said node is scaled to the capacity desired by adding further processor units to or removing processor units from said node; and in that processor units added to the node are allocated the function of acting as one or more services in accordance with one or more kinds of services.

15. A method according to any one of the preceding claims, claim 1, wherein said network is the international extended network Internet; and in that said cache is managed by an operator active on Internet.

16. A cache for newly used data-information within a network, wherein the cache operates between a plurality of users that can request said data-information, and a plurality of servers from which said data-information can be obtained, wherein nodes belonging to said cache are intended to handle inquiries concerning said data-information, wherein subsequent to having been fetched from the server to said cache, the data-information is available within said cache over a given period of time for possible inquiries from further users, wherein nodes that operate within said cache form a hierarchical tree structure that includes a plurality of so-called object nodes, a plurality of so-called directory nodes, and a so-called root node, wherein object nodes are positioned furthest out in said tree structure, wherein said root node comprises the root of said tree structure, wherein possible intermediate levels between an object node and said root node are comprised of directory nodes, wherein a possible user can be connected to said cache via a first object node, wherein data-information stored within said tree structure is stored solely within said object nodes, wherein respective directory nodes include a directory that covers all data-information found stored within object nods that are located beneath said directory nodes in said tree structure, and within which object node respective data-information is stored, wherein said root node includes a directory that covers all data-information stored within said tree structure and within which object node respective data-information is stored; and wherein information concerning where data-information is available is designated meta-information, wherein when specific data-information requested by a user is available in a second object node that is available through said tree structure, said second object node is ordered to send said data-information to said first object node.

17. The cache according to claim 16, wherein all nodes belonging to the cache communicate with overlying nodes in said tree structure through persistent connection; in that all object nodes communicate with other object nodes through temporary connections; in that solely inquiries, responses to inquiries, and meta-information is set via said persistent connections; and in that data-information is sent via said temporary connections.

18. The cache according to claim 16, wherein the root node belonging to said cache is adapted to co-operate with a root node belonging to another cache; in that respective root nodes include a directory that covers all data-information that is available in the tree structure of said other root node, through meta-information belonging to said co-operating root node.

19. The cache according to claim 16, wherein co-operating root nodes can be connected to each other via persistent connections with a common service node; and in that said service node is adapted to direct traffic between co-operating root nodes.

20. The cache according to any one of claims 16, wherein said network is comprised of the internationally extended network Internet; and in that said cache is managed by an operator active on the Internet.

21. A node adapted to operate within a cache for newly used data-information within a network, wherein the cache operates between a plurality of users that can request said data-information, and a plurality of severs from which said data-information can be obtained, wherein nodes belonging to said cache are intended to handle inquiries concerning said data-information, wherein subsequent to having been fetched from the server to said cache, the data-information is available within said cache over a given period of time for possible inquiries from further users, wherein nodes that operate within said cache form a hierarchical tree structure that includes a plurality of so-called object nodes, a plurality of so-called called directory nodes, and a so-called root node, wherein object nodes are positioned furthest out in said tree structure, wherein said root node comprises the root of said tree structure, wherein possible intermediate levels between an object node and said root node are comprised of directory nodes, wherein a possible user can be connected to said cache via a first object node, wherein data-information stored within said tree structure is stored solely within said object nodes, wherein respective directory nodes include a directory that covers all data-information found stored within object nodes that are located beneath said directory nodes in said tree structure, and within which object node respective data-information is stored, wherein said root node includes a directory that covers all data-information stored within said tree structure and within which object node respective data-information is stored; and wherein information concerning where data-information is available is designated meta-information, wherein the node includes four kinds of services, ie. data services, scheduling services, logic services and management services; in that said data services are adapted to store information; in that said scheduling services are adapted to distribute incoming inquiries to different logic services from the user and to forward responses from said logic services to said user; in that said logic services are adapted to search for and handle said requested information; and in that said management services are adapted to handle said information with respect to information updating, which information shall be stored, the duration of such storage, and under which conditions, and so on.

22. A node according to claim 21, wherein said node is comprised of an object node; in that said information relates both to data-information and meta-information concerning the own node.

23. A node according to claim 22, wherein said logic services are adapted, when necessary, to collect data-information from said server, store such fetched data-information in said data services in accordance with guidelines from said management services, store meta-information concerning said data-information in said data services, replicate said meta-information in overlying directory nodes or root nodes in said tree structure via said scheduling services, and send said data-information to said user.

24. A node according to claim 22, wherein said logic services are adapted to fetch data-information from said data services belonging to the own node when ordered to send data-information to a first object node, and to send the thus fetched data-information to logic services belonging to said first object node; in that logic services belonging to said first object node are adapted to store the thus received data-information in said data services belonging to the own node in accordance with guidelines from said management services belonging to said own node; in that logic services belonging to said first object node are adapted to store meta-information relating to said data-information in said data services; in that logic services belonging to said first object node are adapted to replicate said meta-information in overlying directory nodes or root nodes in said tree structure, via said scheduling services; and in that logic services belonging to said first object node are adapted to send said data-information to said user.

25. A node according to claim 21, wherein said node is a root node or a directory node; and in that said information solely relates to meta-information.

26. A node according to claim 21, wherein all nodes belonging to a cache communicate with overlying nodes in said tree structure via associated scheduling services and by means of persistent connections; in that all object nodes communicate with other object nodes via associated logic services and by means of temporary connections; and in that only inquiries, inquiry responses, and meta-information are sent via said persistent connections; and in that data-information is sent via said temporary connections.

27. A node according to claim 21, wherein respective services are implemented by means of a processor unit and associated units adapted to carry out said services; and in that a plurality of processor units are adapted to operate in parallel within respective kinds of services.

28. A node according to claim 21, wherein a processor unit is adapted to provide a plurality of services within one kind of service.

29. A node according to claim 21, further comprising by a processor unit adapted to provide a plurality of services within different kinds of services.

30. A node according to claim 27, wherein said node can be scaled to a desired capacity, for instance when needing to increase or decrease available capacity, by adding processor units to or removing processor units from said node; and in that any processor units added to the node are allocated the function of operating as one or more services in accordance with one or more kinds of services.

* * * * *